US008626159B2

(12) United States Patent
Noguchi et al.

(10) Patent No.: US 8,626,159 B2
(45) Date of Patent: Jan. 7, 2014

(54) MOBILE DEVICE AND LOCATION REGISTRATION METHOD

(75) Inventors: Katsuhiro Noguchi, Yokohama (JP); Gou Okuizumi, Yokohama (JP); Hideo Mochida, Kawasaki (JP); Akimichi Tanabe, Kawasaki (JP); Masashi Kanauchi, Yokosuka (JP); Taketoshi Nakajima, Tokyo (JP)

(73) Assignees: NTT DoCoMo, Inc., Tokyo (JP); NEC Corporation, Tokyo (JP); Panasonic Mobile Communications Co., Ltd., Yokohama (JP)

(*) Notice: Subject to any disclaimer, the term of this patent is extended or adjusted under 35 U.S.C. 154(b) by 1201 days.

(21) Appl. No.: 11/668,894

(22) Filed: Jan. 30, 2007

(65) Prior Publication Data
US 2007/0254650 A1 Nov. 1, 2007

(30) Foreign Application Priority Data

Jan. 31, 2006 (JP) ................................ P2006-023769
Feb. 6, 2006 (JP) ................................ P2006-028984

(51) Int. Cl.
*H04W 4/00* (2009.01)
(52) U.S. Cl.
USPC ................ 455/433; 455/435.1; 455/432.1; 455/432.3
(58) Field of Classification Search
USPC ................ 455/433, 435.1, 432.1, 432.3
See application file for complete search history.

(56) References Cited

U.S. PATENT DOCUMENTS

2005/0221823 A1 10/2005 Noguchi et al.
2007/0091877 A1* 4/2007 Lundin et al. ................ 370/353

FOREIGN PATENT DOCUMENTS

JP 2000-23232 1/2000
JP 2002-165260 6/2002

(Continued)

OTHER PUBLICATIONS

3 GPP release 6: Digital cellular telecommunications system (phase 2+); Universal mobile Telecommunications system (UMTS);Mobile radio interface Layer 3 specification; Core network protocols; Dec. 2005.*

(Continued)

*Primary Examiner* — Olumide T Ajibade Akonai
*Assistant Examiner* — Michael Irace
(74) *Attorney, Agent, or Firm* — Oblon, Spivak, McClelland, Maier & Neustadt, L.L.P.

(57) ABSTRACT

Provided are a mobile device and location registration method that, even when packet communications are being restricted and the location cannot be registered, the location can be registered rapidly when the access restriction is released. The mobile device comprises a packet timing unit that times a predetermined time; a location registration unit that registers the location to the control server for packet communications; a timing control unit that, if control server for packet communications is under access restriction, controls the timing operations to be temporarily stopped; and a location registration control unit that controls the location registration unit to register the location to the control server for packet communications, and also controls the location registration unit to register the location to the control server for packet communications if the control server for packet communications has released the access restriction and if the timing control unit has stopped the timing operations of the packet timing unit.

5 Claims, 8 Drawing Sheets

(56) References Cited

FOREIGN PATENT DOCUMENTS

| JP | 2004-64767 | 2/2004 |
|---|---|---|
| KR | 1998-0013032 | 4/1998 |
| KR | 2001-0087035 | 9/2001 |
| KR | 2003-0039123 | 5/2003 |
| KR | 2003-0042396 | 5/2003 |
| WO | WO 2005/064954 A1 | 7/2005 |

OTHER PUBLICATIONS

3$^{rd}$ Generation Partnership Project; Technical Specification Group Core Network and Terminals; Mobile radio interface Layer 3 specification; Core network protocols; Stage 3 (Release 6) 3GPP TS 24.008, V6.11.0, Dec. 2005.

"Digital cellular telecommunications system (phase 2+); Universal Mobile Telecommunications System (UMTS); Mobile radio inferface Layer 3 specification; Core network protocols, Stage 3 (3GPPTS 24.008 version 6.11.0 Release 6)", ETSI Standards, vol. 3-CN1, No. V6110, XP-014032486, Dec. 2005, 1 front page, pp. 1-527.

"CRs to Rel-6 WI "ACBOP" for TS 23.122 and TS 24.008", TSG CN WG1, XP-002435293, Mar. 2, 2005, pp. 1-32.

"Correction of domain specific access control", 3GPP TSG-CT1 Meeting #41 Tdoc C1-060622, Feb. 13-17, 2006, pp. 1-17.

Yi-Bing Lin, et al. "A Mobility Management Strategy for GPRS", IEEE Transactions on Wireless Communications, vol. 2, No. 6, Nov. 2003, pp. 1178-1188.

Office Action issued Feb. 15, 2011, in Taiwanese patent Application No. 096103562 (with English translation).

\* cited by examiner

MOBILE DEVICE AND LOCATION REGISTRATION METHOD

BACKGROUND OF THE INVENTION

1. Field of the Invention

The present invention relates to a mobile device and location registration method for registering location information of the device itself.

2. Related Background Art

Currently, such mobile devices as portable telephones that can conduct voice communications and packet communications are widely known. At predetermined cycle this mobile device can register the location of the device itself to a control server for packet communications (for example, a SGSN, specifically, a Serving GPRS Support Node), and in addition, can register the location of the device itself to a control server for voice communications (for example, a VLR/MSC, specifically, a Visitor Location Register/Mobile Switching Center).

As the mobile device can register location information to the respective control servers at predetermined cycle in this way, the server side can ascertain where the mobile device is located, and can conduct call out processing to the mobile device. Further, the well-known technology according to Japanese Patent Application Laid-open No. 2000-23232 is technology that can register location information. Disclosed in this patent literature is a location information notification method and device that can conduct highly precise and efficient control of the location of a mobile station with the minimum necessary communications for location registration even if the mobile station is moving at a slow velocity.

In this regard, the access restriction, which comprises outgoing call restriction and incoming call restriction, is executed in order to prevent network congestion. Concretely, system information, which is information for confirming the location of the mobile device, is delivered from the base station to the mobile device. This system information comprises information indicating that communications to an certain terminal have been restricted, and the mobile device that has received this system information can determine whether or not the device itself is the target of the access restriction. This access restriction may be either the restriction of packet communications, the restriction of voice communications, or both.

Meanwhile, the location is registered with the control server for packet communications and control server for voice communications at every predetermined time (for example, 54 minutes) based on the mobile device registering the location with the control server for packet communications every predetermined time (for example, 54 minutes) timed by a timer, and then the location is registered with the control server for voice communications from the control server for packet communications (the so-called combined update).

However, this kind of combined update cannot be conducted when the control server for packet communications is under access restriction. For this reason, in current systems, if the control server for packet communications is under access restriction, the mobile device is configured to switch the interval of the timer, and to register the location at least with the control server for voice communications (including the control server for packet communications if the access restriction of the control server for packet communications has been released) every predetermined time (for example, 180 minutes, which is set to be longer than the aforementioned 54 minutes). By registering the location with the control server for voice communications in this way, at least the control server for voice communications can conduct call out processing for executing voice communications.

According to this configuration, if the control server for packet communications is under access restriction, the control server for packet communications can ascertain the location of the mobile device after 180 minutes have elapsed. Namely, the location of the mobile device cannot be ascertained for a long period of time. For this reason, the problem arises that, for example, call out processing cannot be executed in relation to the mobile device because the location has not been registered even though the control server for packet communications has released access restriction.

SUMMARY OF THE INVENTION

Thus, in order to resolve the problem described above, the present invention has an object of providing a mobile device and location registration method that, even when packet communications are being restricted and the location cannot be registered, the location can be registered rapidly when the access restriction is released.

In order to resolve the problem described above, the mobile device of the present invention is a mobile device that registers location to a control server for packet communications that memorizes location information of a communication terminal for executing packet communications, and to a control server for voice communications that memorizes location information of a communication terminal for executing voice communications, comprising: timing unit for packet communications that times a predetermined time; location registration unit that registers location to the aforementioned control server for packet communications; timing control unit that, if the aforementioned control server for packet communications has restricted communications, controls timing operations of the timing unit for packet communications to temporarily stop when the aforementioned timing unit for packet communications times the predetermined time; and location registration control unit that controls the aforementioned location registration unit to register the location to the aforementioned control server for packet communications for each time when aforementioned timing unit for packet communications times, and also controls the aforementioned location registration unit to register the location to he aforementioned control server for packet communications if the aforementioned control server for packet communications is released the access restriction and if the timing operations of the aforementioned timing unit for packet communications are stopped by the aforementioned timing control unit.

In addition, the location registration method of the present invention is a location registration method that registers location to control server for packet communications that memorizes location information of a communications terminal for executing packet communications and to a control server for voice communications that memorizes location information of a communications terminal for executing voice communications, the method comprising: a packet communications timing step for timing for a predetermined time; a location registering step for registering a location to the aforementioned control server for packet communications; a timing control step for, if the aforementioned control server for packet communications has restricted communications, controlling timing operations to temporarily stop when the predetermined time is timed in the aforementioned packet communications timing step; and a location registration control step for controlling the location to be registered to the aforementioned control server for packet communications in the aforementioned location registering step for each time timed in the aforementioned packet communications timing step, and also controls the location to be registered to the aforementioned control server for packet communications in the aforementioned location registering step if the access restriction is released by the aforementioned control server for packet communications, and if the timing operations of the aforementioned packet communications timing step are stopped by the aforementioned timing controlling step.

According to the mobile device or location registration method of the present invention, at every predetermined time the location is first registered with the control server for packet communications, and if packet communications have been restricted, control is executed such that the predetermined time is not repeated, and once the predetermined time has been timed, the timing operations are temporarily stopped. Then, control can be executed to register the location with the control server for packet communications if the restriction of packet communications is released and if the timing operations have been stopped.

It is thereby possible to prevent the control server for packet communications from being unable to ascertain the location of the mobile device, and mistakenly determining that the mobile device is not present in the control area of the control server for packet communications. Consequently, when the access restriction has been released, the control server for packet communications can immediately execute location registration and correctly ascertain the presence of the mobile device. As a result, call out processing to the applicable mobile device can be reliably executed, and the mobile device can reliably receive incoming calls.

In addition, preferably the mobile device further comprises a voice communications timing unit that begins timing operations when the location registration with the control server for voice communications has been completed; and when the set time has been timed by the voice communications timing unit, said location registration control unit controls the location registration unit to register the location with the control server for voice communications.

Timing operations for registering the location with the control server for voice communications are thereby executed with the location registration with the control server for voice communications has been completed. Then, the location can be registered with the control server for voice communications when the set time has been timed. For this reason, it is possible to prevent the control server for voice communications from being unable to ascertain the location of the mobile device, and mistakenly determining that the mobile device is not present in the control area of the control server for voice communications. Consequently, the control server for voice communications can correctly ascertain the presence of the mobile device, and therefore call out processing to the applicable mobile device can be reliably executed, and the mobile device can reliably receive incoming calls.

According to the present invention the location can be immediately registered when the access restriction has been released even when packet communications are being restricted and the location cannot be registered.

DESCRIPTION OF THE PREFERRED EMBODIMENTS

The present invention can be easily understood by considering the following detailed description while referring to the added diagrams that are indicated for one embodiment. Next, an optimal embodiment of the present invention will be explained while referring to the added diagrams. When possible, the same codes will be added to the same parts, and redundant description will be omitted.

Figure 1:
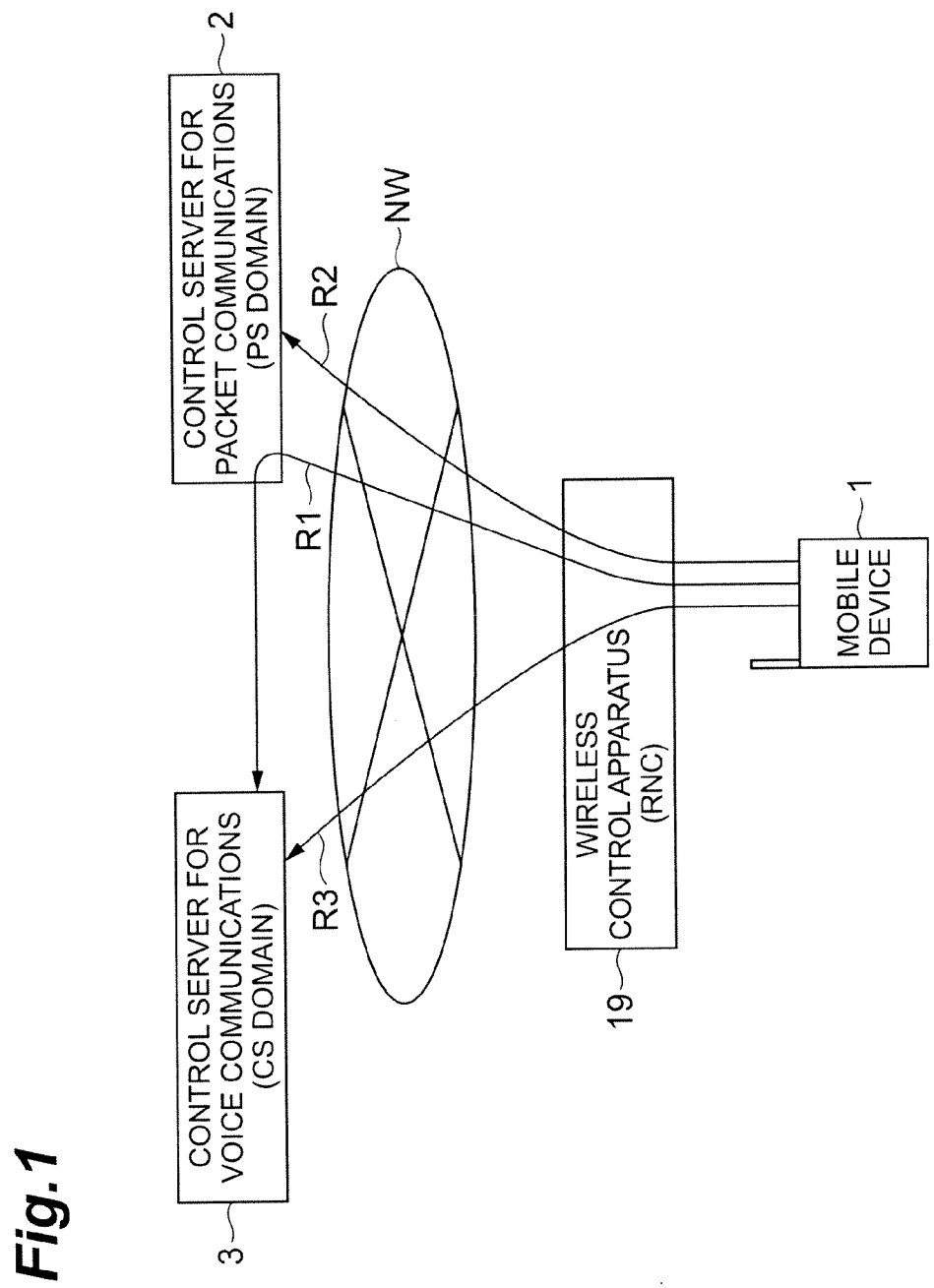
FIG. 1 is a schematic diagram schematically indicating the relationship between the mobile device, control server for packet communications, and control server for voice communications of the present embodiment.
Figure 2:
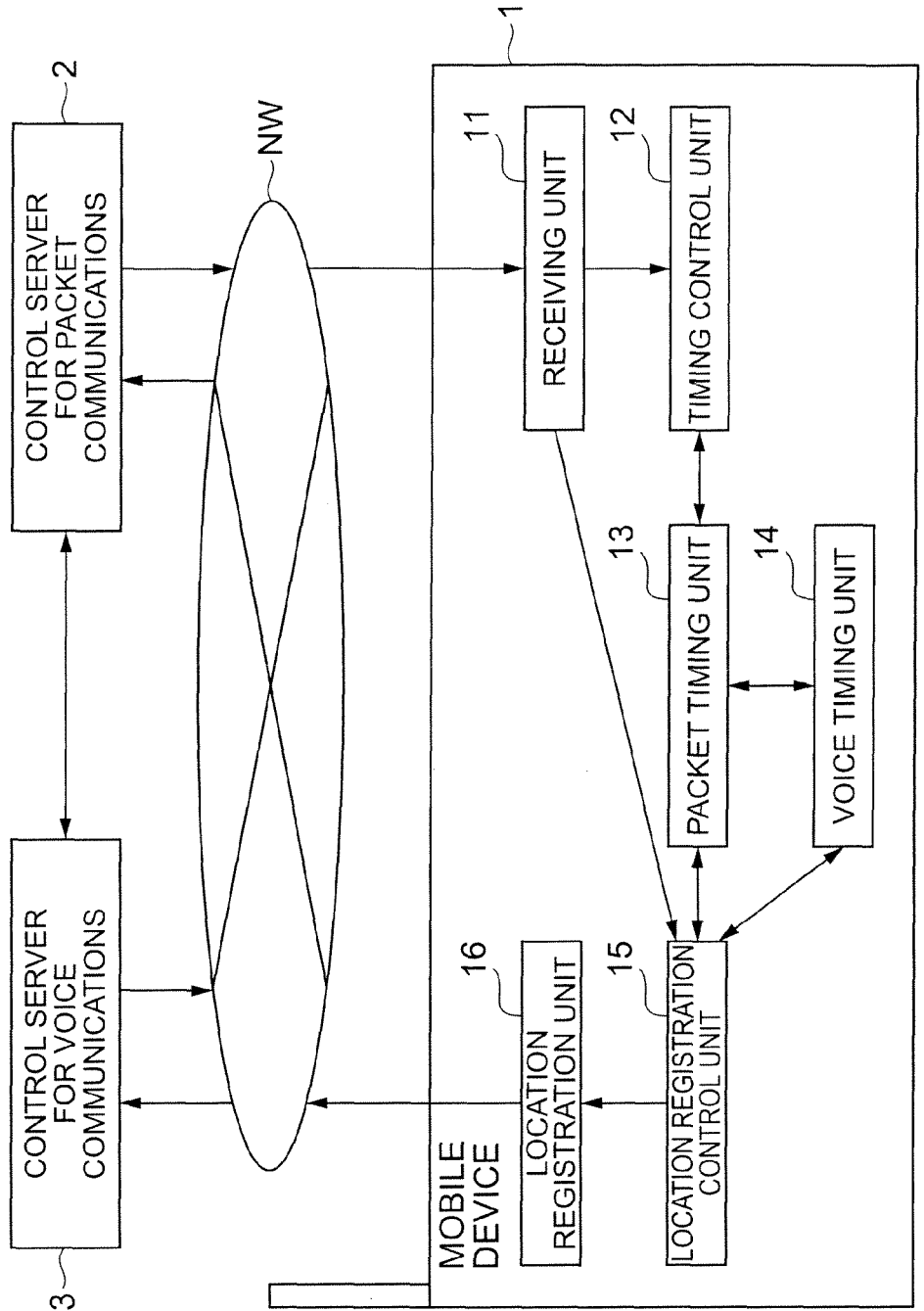
FIG. 2 is a configurational diagram of the functions of the mobile device.
Figure 3:
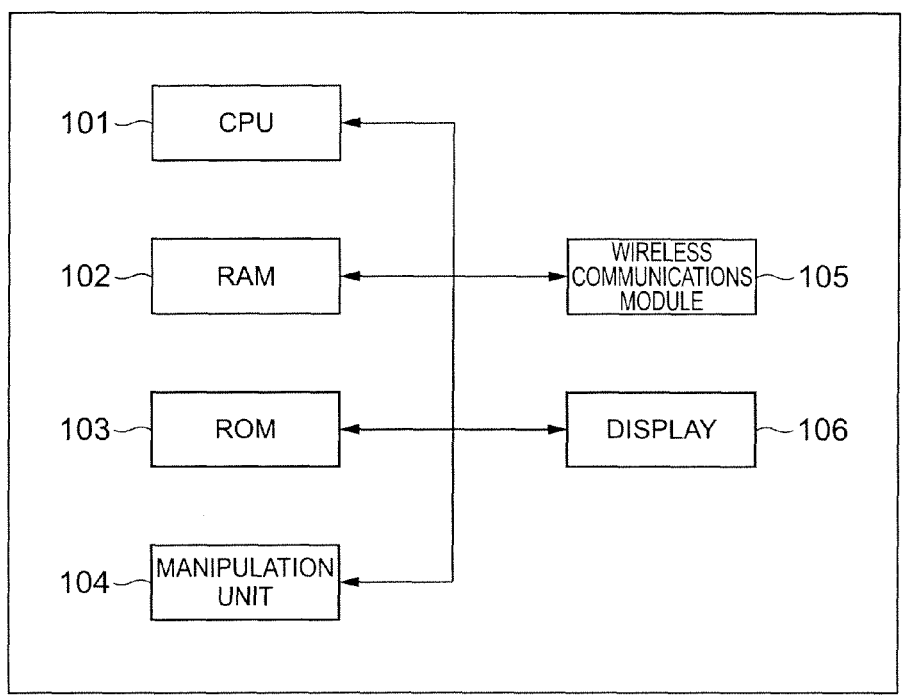
FIG. 3 is a configurational diagram of the hardware of the mobile device.

A mobile device that is an embodiment of the present invention will be explained using FIGS. 1 to 3. FIG. 1 is a schematic diagram schematically indicating the relationship between a mobile device 1, a control server for packet communications 2, and a control server for voice communications of the present embodiment 3. FIG. 2 is a configurational diagram of the functions of the mobile device 1. FIG. 3 is a configurational diagram of the hardware of the mobile device 1.

As indicated in FIG. 1, the mobile device 1 is a communications terminal such as a portable telephone that registers the location thereof with the control server for packet communications 2, and the control server for voice communications 3. When executing communications such as voice communications and packet communications with another mobile device (not indicated in the diagram), the mobile device 1 needs to register the location of the device itself to the respective control servers. As long as the mobile device 1 is a communications terminal that conducts this kind of location registration, the device is not particularly limited, and may be a PDA, personal computer or the like. In the explanation given here, the mobile device 1 is a portable telephone.

Further, mediating between the mobile device 1 and the control server for packet communications 2 or the control server for voice communications 3 is a wireless control apparatus 19 (for example, an RNC, specifically, a Radio Network Controller) that controls the mobile device 1 and the communications network NW that relays communications, namely, voice communications, packet communications, and location registration communications, that are executed between the mobile device 1 and these control servers. The wireless control apparatus 19 controls the mobile device 1 through a base station in the control area.

The control server for packet communications 2 is a server (for example, a SGSN) that memorizes the location information of the mobile device 1 (communications terminal) for packet communications use. Specifically, the control server for packet communications 2 is a server (PS domain server) that receives location registration executed from the mobile device 1 through the communications network NW, and memorizes the location information of this mobile device 1 for packet communications use. This location information passes through route R1 or route R2 (the conditions for selecting the respective route R1 and route R2 will be described later). Packet communications between the mobile device 1 and another mobile device becomes possible by memorizing the location information for packet communications use and then communicating. The control server for packet communications 2 is configured as a computer (or, a unit that integrates a computer) that physically comprises a computing apparatus such as a CPU (Central Processing Unit), a memory apparatus such as a memory, a storage apparatus such as a hard disk, commutations apparatus such as a modem or LAN card, input apparatuses such as a mouse and keyboard, a display apparatus such as a display, and the like.

The control server for voice communications 3 is a server (for example, VLR/MSC) that memorizes the location information of the mobile device 1 (communications terminal) for use in voice communications. Specifically, the control server for voice communications 3 is a server (CS domain server) that receives location registration executed from the mobile device 1 through the communications network NW, and memorizes the location information of this mobile device 1 for packet communications use. This location registration may be indirectly executed from the mobile device 1 by passing through the control server for packet communications 2 (route R1), or may be directly executed from the mobile device 1 without passing through the control server for packet communications 2 (route R3) (the conditions for selecting the respective route R1 and route R3 will be described later). Voice communications between the mobile device 1 and another mobile device becomes possible by memorizing the location information for use in voice communications and then communicating. The control server for voice communications 3 has the same physical configuration as that of the control server for packet communications 2.

Continuing, the essential configurational elements of the mobile device 1 will be explained. As indicated in FIG. 2, the mobile device 1 functionally comprises: a receiver 11, a timing control unit 12 (timing control means), a packet timing unit 13 (timing means for packet communications), a voice timing unit 14 (voice communications timing means), a location registration control unit 15 (location registration control means), and a location registration unit 16 (location registration means). Further, these respective functional configurational elements may be physically distributed, and the aggregate of these configurational elements may be taken as the mobile device 1.

Moreover, as indicated in FIG. 3, the mobile device 1 is configured as a portable telephone comprising a computing apparatus CPU 101 (Central Processing Unit), memory apparatuses RAM 102 and ROM 103, a manipulation unit 104 comprising 10-key buttons and the like, a wireless communications module 105 capable of communications with a base station, and a display 106 that displays the status of the device itself to the user of the mobile device 1. The various functions of the timing control unit 12, the packet timing unit 13, the voice timing unit 14, and the location registration control unit 15 explained in FIG. 2 are realized by reading specified computer software on the hardware of the CPU 101, RAM 102, ROM 103 and the like indicated in FIG. 3, by the operations of the wireless communications module 105 and the display 106 controlled by the CPU 101 based on the manipulation unit 104, and by reading and writing data in the RAM 102.

The various functional elements will be explained below in detail using FIG. 2.

The receiver 11 is a unit that receives through a base station (not indicated in the diagram) various types of information comprising system information and the like from servers such as the control server for packet communications 2 and the control server for voice communications 3. system information comprises location confirmation information for confirming the location of the mobile device 1, communications restriction information indicating that communications with an optional mobile device have been restricted (including outgoing call restriction and incoming call restriction), and time information indicating the time cycle of location registration with the control server for voice communications 3. The system information is sent to the mobile device 1 every predetermined time (for example, several seconds to several minutes). By receiving this system information the mobile device 1 can determine whether or the device itself is the target of the access restriction. Further, this access restriction may be restriction of packet communications, restriction of voice communications, or both.

The timing control unit 12 is a part that controls the timing operations of the packet timing unit 13 to temporarily stop after the packet timing unit 13 has timed (if measuring) the predetermined time (for example, 54 minutes) if the receiver 11 has received system information indicating that the control server for packet communications 2 has restricted packet communications (specifically, if the control server for packet communications 2 has restricted packet communications comprising an incoming call). The packet timing unit 13 is a unit that times the predetermined time as will be described later.

The packet timing unit 13 is a timer that repeatedly times the predetermined time (for example, 54 minutes). As will be described later, while the control server for packet communications 2 is not under access restriction, this time stipulates the cycle at which the location information of the mobile device 1 is automatically registered with the control server for packet communications 2 for packet communications use.

The voice timing unit 14 is a timer that begins execution of timing operations for processing location registration with the control server for voice communications 3, and begins the timing operations when the location registration processing for the control server for voice communications 3 has been completed. The length of time that the voice timing unit 14 times may be set longer than the time of the packet timing unit 13 (for example, 54 minutes), and is, for example, 180 minutes. This length of time, as will be described later, is the time during which the automatic communication of the location information of the mobile device 1 for use in voice communications 3 is stopped.

The location registration control unit 15 is a part that controls the location registration unit 16 to register the location with the control server for packet communications 2 for each time (for example, 54 minutes) that the packet timing unit 13 times. The location registration unit 16, as will be described later, is a part that registers the location with the aforementioned two control servers. Moreover, the location registration control unit 15 controls the location registration unit 16 to register the location with the control server for packet communications 2 if the control server for packet communications 2 has released the access restriction and if the timing control unit 12 has stopped the timing operations of the packet timing unit 13. When this location registration is executed, the packet timing unit 13 restarts the timing operation. Further, the location registration control unit 15 controls the location registration unit 16 to register the location of the mobile device 1 with the control server for voice communications 3 when the set time (for example, 180 minutes) has been timed by the voice timing unit 14.

The location registration unit 16 is a part that registers the location of the mobile device 1 with the control server for packet communications 2 and control server for voice communications 3. If the system information indicates that communications is not being restricted by the control server for packet communications 2, the location registration unit 16 registers the location with the control server for packet communications 2 (including combined update procedure) at the predetermined times (for example, every 54 minutes). Moreover, if the voice timing unit 14 has timed the set time (for example, 180 minutes), the location is registered with the control server for voice communications 3.

Figure 4:
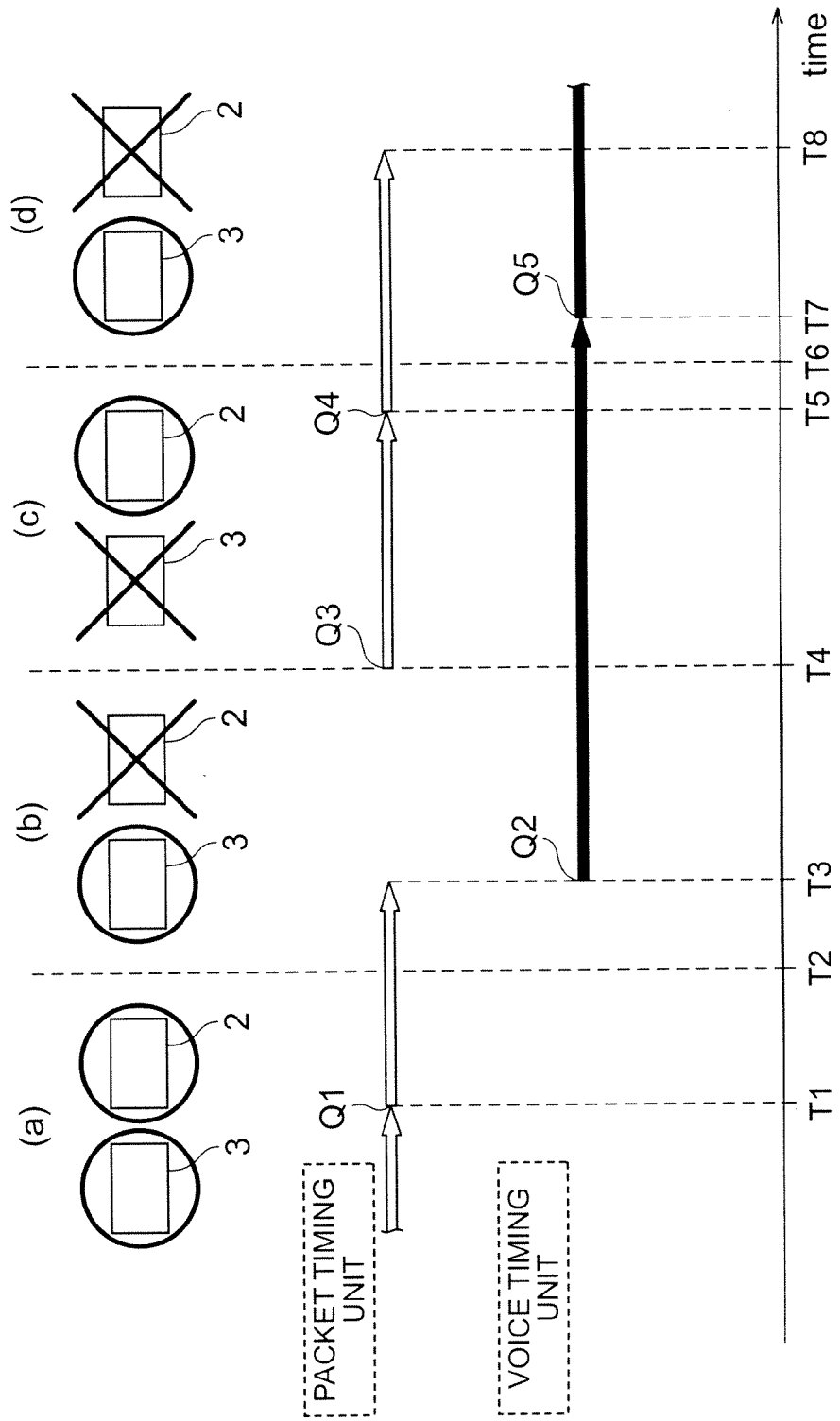
FIG. 4 is a schematic diagram schematically indicating the timing of the timing operations and of the location registration that changes corresponding to one example of being when communications are being restricted.

Continuing, the timing of the timing operations and location registration, which changes corresponding to when both the control server for packet communications 2 and the control server for voice communications 3 are under access restriction, will be explained using FIG. 4. FIG. 4 is a schematic diagram schematically indicating the timing of the timing operations and of the location registration that changes corresponding to one example of being when communications are being restricted.

FIG. 4 comprises the four parts FIGS. 4A to 4D. Moreover, each of the FIGS. 4A to 4D comprises the following 3 parts. Specifically, each comprises: a part that indicates when both the control server for packet communications 2 and the control server for voice communications 3 are under access restriction; a part that indicates timing operations of the packet timing unit 13 (white arrow) and the timing of the registration of location with the control server for packet communications 2; and a part that indicates timing operations of the voice timing unit 14 (black arrow) and the timing of the registration of location with the control server for voice communications 3. Each of the aforementioned two control servers is circled when communications are not being restricted and it is possible to communicate, and is marked with an "X" when communications are being restricted and it is not possible to communicate. Moreover, location registration timing is indicated by Q1 to Q5. Further, the horizontal axis in FIG. 4 indicates the time axis (time), and in addition to the passage of time from T1 to T8, indicates the orderly transition from FIGS. 4A to 4D.

First, as indicated in FIG. 4A, in both the control server for packet communications 2 and the control server for voice communications 3, if communications are not being restricted and communication is possible, after location registration with the control server for packet communications 2 has been executed from the mobile device 1, location registration with the control server for voice communications 3 is executed from the control server for packet communications 2 (route R1 indicated in FIG. 1). This is the type of location registration called "combined update", and is executed cyclically. In this way, while communications are not being restricted by the control server for packet communications 2, the location information of the mobile device 1 is automatically registered with the control server for packet communications 2 for packet communications use every predetermined time (for example, 54 minutes) (T1). Moreover, after this location registration, the control server for packet communications 2 automatically registers to the control server for voice communications 3 the location information of the mobile device 1 for use in voice communications (Q1). In addition, the packet timing unit 13 restarts the timing operations when this location registration is executed.

Next, as indicated in FIG. 4D, when communications is being restricted by the control server for packet communications 2 (T2), this kind of access restriction is recognized in the mobile device 1 by system information. At this time, the timing control unit 12 controls the packet timing unit 13 to temporarily stop timing operations after the predetermined time (for example, 54 minutes) has been timed (T3). Following this control, the packet timing unit 13 temporarily stops timing operations. Moreover, at this time (T3) when the mobile device 1 has been notified that the location cannot be registered with the control server for packet communications 2 and with the control server for voice communications 3, control is begun to register the location at least with the control server for voice communications 3, which is not under access restriction. If the location is successfully registered with the control server for voice communications and the mobile device 1 receives a response to this location registration, the voice timing unit 14 begins to execute timing operations following the time information (for example, 180 minutes) indicated by the system information.

Next, as indicated in FIG. 4C, when the access restriction is released by the control server for packet communications 2, and when the control server for voice communications 3 is under access restriction (T4), this kind of access restriction is recognized in the mobile device 1 by system information. Here, the mobile device 1 determines whether or not the control server for packet communications 2 has releases the access restriction, and whether or not the timing operations of the packet timing unit 13 have been temporarily stopped. If the control server for packet communications 2 is under access restriction, or if the timing operations of the packet timing unit 13 are advancing, the mobile device 1 waits until new system information is received. On the other hand, if the control server for packet communications 2 has released the access restriction, and if the timing operations of the packet timing unit 13 have been temporarily stopped, the location registration control unit 15 controls the location registration unit 16 to register the location with the control server for packet communications 2. For this reason, the location information of the mobile device 1 is automatically registered with control server for packet communications 2 (Q3, route R2 indicated in FIG. 1). Moreover, the packet timing unit 13 restarts the timing operations when this location registration is executed. Then, when the predetermined time (for example, 54 minutes) has elapsed using the packet timing unit 13 (T5), the location information of the mobile device 1 is automatically registered with control server for packet communications 2 (Q4, route R2 indicated in FIG. 1). Moreover, the packet timing unit 13 restarts the timing operations when this location registration is executed.

Next, as indicated in FIG. 4D, if the control server for packet communications 2 is under access restriction, and if the control server for voice communications 3 has released the access restriction (T6), this kind of access restriction is notified to the mobile device 1 by system information. At this time, no location registration can be executed because the timing operations of the packet timing unit 13 and the voice timing unit 14 have not been completed. Later, when the voice timing unit 14 has timed the set time (for example, 180 minutes) (T7), the location registration control unit 15 controls the location registration unit 16 to register the location of the mobile device 1 with the control server for voice communications 3. For this reason, the location information of the mobile device 1 is automatically registered with the control server for voice communications 3 for use in voice communications (Q5, route R3 indicated in FIG. 1). When receiving a response that this communication is completed, the voice timing unit 14 times the predetermined time again.

Further, when the voice timing unit 14 has timed the set time (for example, 180 minutes), if the access restriction has also been released by the control server for packet communications 2, this kind of access restriction is notified to the mobile device 1 by system information. Then, the location is registered with the control server for packet communications, and the location is next registered with the control server for voice communications from the control server for packet communications (the so-called combined update).

Further, subsequently, the timing control unit 12 controls the packet timing unit 13 to temporarily stop timing operations after the predetermined time (for example, 54 minutes) has been timed (T8). Following this control, the packet timing unit 13 temporarily stops timing operations.

Figure 5:
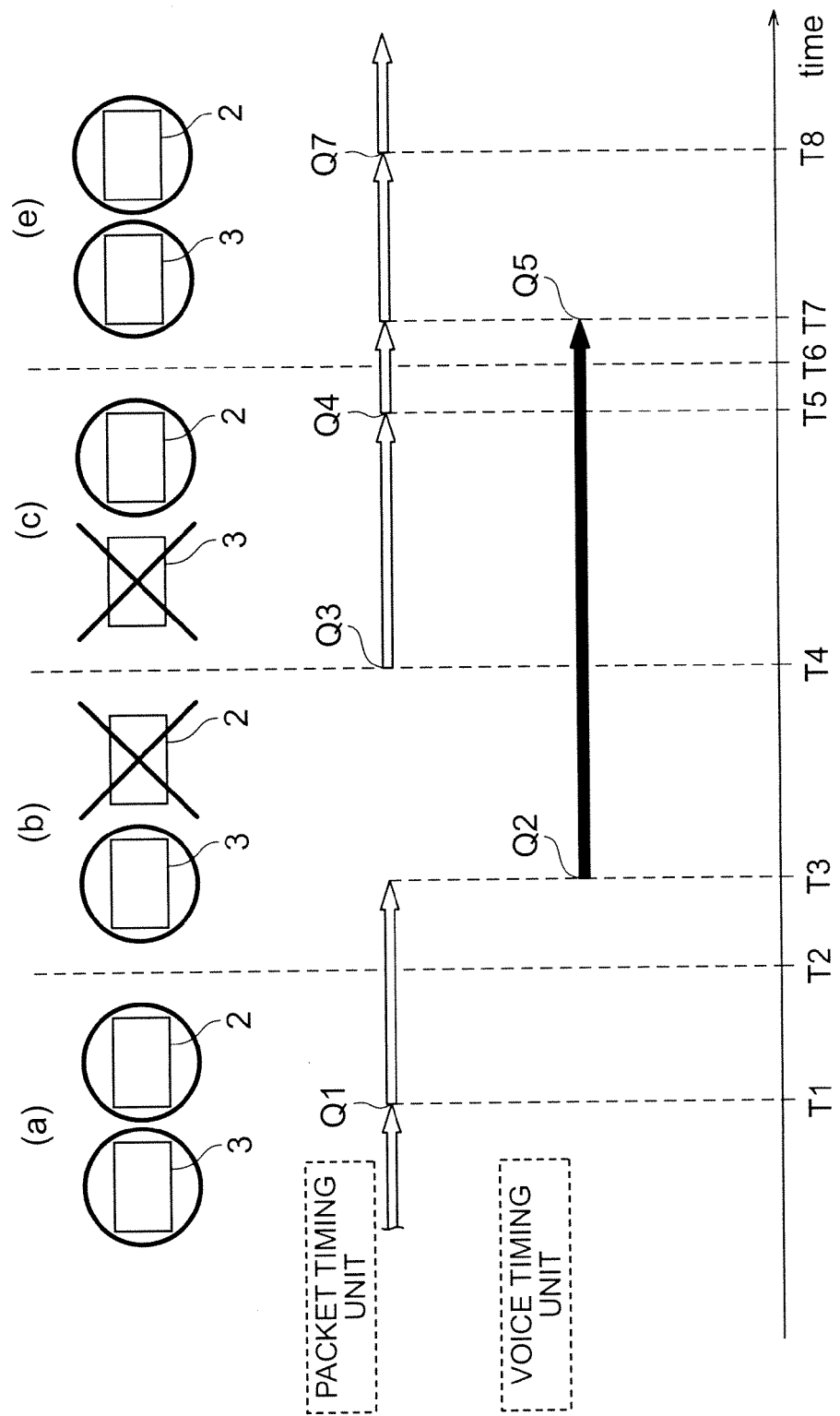
FIG. 5 is a schematic diagram schematically indicating the timing of the timing operations and of the location registration that changes corresponding to one example of being when communications are being restricted.

Described next is the transition from when the control server for packet communications 2 is under access restriction and the control server for voice communications 3 has released the access restriction as indicated in FIG. 4C to when both the control server for packet communications 2 and the control server for voice communications 3 have released the access restriction. FIG. 5 is a schematic diagram schematically indicating the timing of the timing operations and of the location registration that changes corresponding to one example of being when communications are being restricted. The difference from FIG. 4 is the situation when both the control server for packet communications 2 and the control server for voice communications 3 have released the access restriction as indicated in FIG. 5E.

As indicated in FIG. 5E, when the control server for packet communications 2 has released the access restriction, and when the control server for voice communications 3 as released the access restriction (T6), this kind of release state is notified to the mobile device 1 by system information. At this time, no location registration can be executed because the timing operations of the packet timing unit 13 and the voice timing unit 14 have not been completed.

Then, after the voice timing unit 14 has timed the predetermined time (T7), when the access restriction has been released by both the control server for packet communications 2 and the control server for voice communications 3, the location information of the mobile device 1 is automatically registered with the control server for packet communications 2 and the control server for voice communications 3. At this time, the location is registered with the control server for voice communications 3 from the control server for packet communications 2 (the so-called combined update) (Q5, route R1 indicated in FIG. 1). Moreover, the timing operations of the packet timing unit 13 and the voice timing unit 14 are reset in conjunction with this operation. Then, only the timing operations of the packet timing unit 13 are started again.

Moreover, after the packet timing unit 13 has timed the predetermined time (for example, 54 minutes) (T8), the location information of the mobile device 1 is automatically registered with the control server for packet communications 2 and the control server for voice communications 3. At this time, the location is registered with the control server for voice communications 3 from the control server for packet communications 2 (the so-called combined update) (Q7, route R1 indicated in FIG. 1). Then, the packet timing unit 13 begins executing timing operations.

Moreover, as indicated in FIG. 6F, when the restriction of packet communications is released, and when the control server 3 for voice communications has been released and the timing operations of the packet timing unit 13 have been stopped (T9), in conjunction with control to register the location with the control server for packet communications 2, control can be executed for the control server for packet communications 2 to register the location with the control server for voice communications 3 (combined update) (Q8). When the mobile device 1 receives responses to these location registrations, the timing operations of the voice timing unit 14 are ended.

In addition, when the packet timing unit 13 times the predetermined time (T10), in conjunction with control to register the location with the control server for packet communications 2, control can be executed for the control server for packet communications 2 to register the location with the control server for voice communications 3 (combined update) (Q9).

Figure 7:
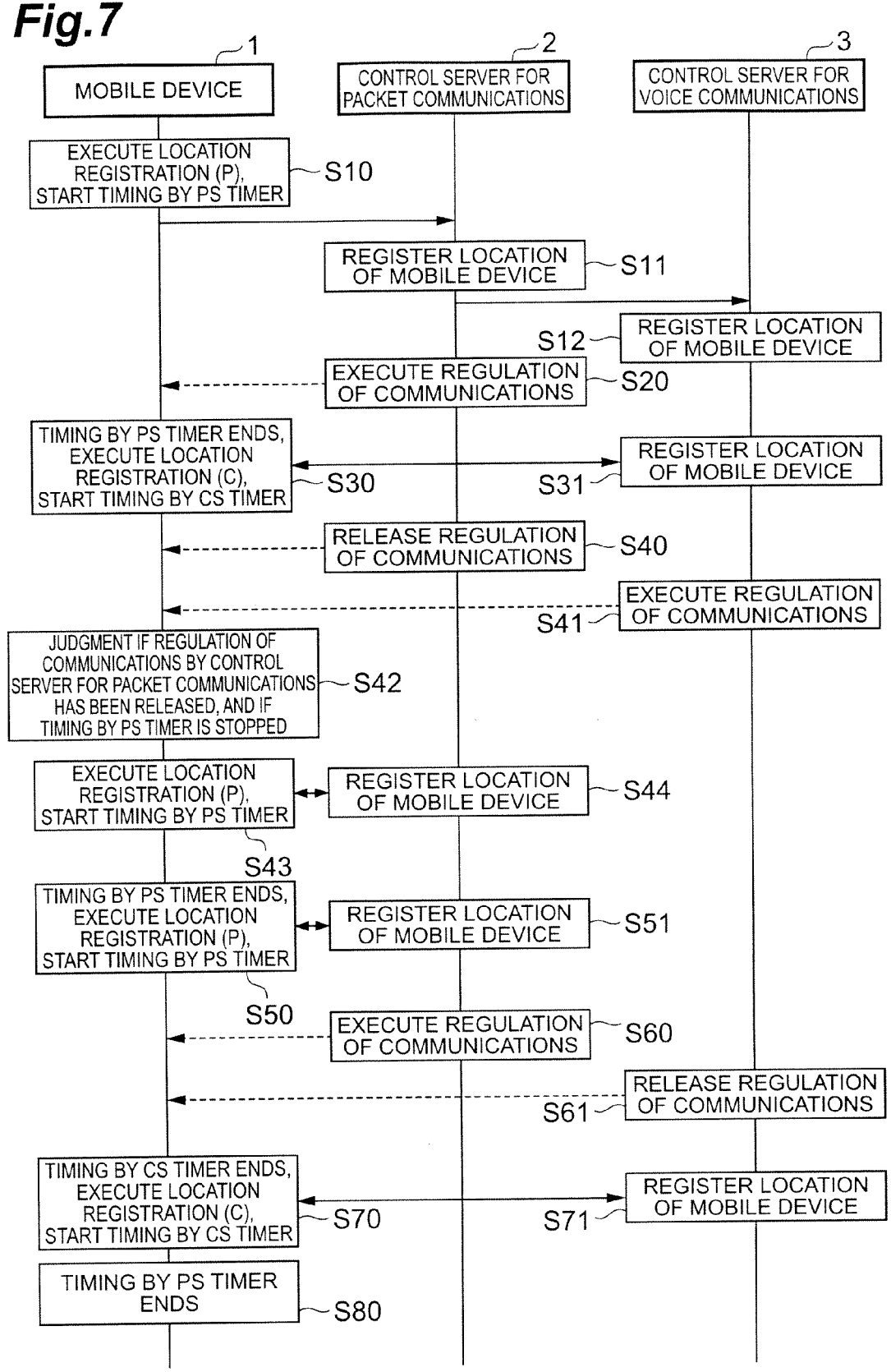
FIG. 7 is a sequence diagram indicating the operations of registering the location of the mobile device in the example of when communications are being restricted as indicated in FIG. 4.

Continuing, the respective operation of the mobile device 1, control server for packet communications 2, and control server for voice communications 3 will be explained using the sequence diagram indicated in FIG. 7. FIG. 7 is a sequence diagram indicating the operations of registering the location of the mobile device 1 in the example of when communications are being restricted as indicated in FIG. 4.

First, if communications are not being restricted and communication is possible for both the control server for packet communications 2 and the control server for voice communications 3, the mobile device 1 executes location registration processing (S10), and the location is registered from the mobile device 1 to the control server for packet communications 2 (S11, location registration step). In addition, when executing this location registration processing, the packet timing unit 13 (called the PS timer hereinafter) begins timing operations (S10, packet communications timing step). When this location registration processing has been completed (S10 to 11), the location of the mobile device 1 is registered from the control server for packet communications 2 to the control server for voice communications 3 (S12, location registration step).

Next, when the control server for packet communications 2 executes access restriction (S20), this kind of access restriction is notified to the mobile device 1 by system information. At this time, after the PS timer has timed the predetermined time (for example, 54 minutes), the timing control unit 12 controls the timing operations to be temporarily stopped (timing control step). Following this control, the timing operations of the PS timer are temporarily stopped (S30). Moreover, at the same time, in conjunction with automatically registering the location information of the mobile device 1 with the control server for voice communications 3 for use in voice communications, (S30 to S31, location registration step), the voice timing unit 14 (called the CS timer hereinafter) begins executing timing operations (S30, timing for voice communications step).

In more detail, at S30, after the access restriction performed by the control server for packet communications 2 has been notified to the mobile device 1 by system information, the PS timer times the predetermined time, and the operations thereof expire. Here, the location cannot be registered with both the control server for packet communications 2 and the control server for voice communications 3 (combined update). Then, the location is registered with the control server for voice communications 3, which is not restricting, and the voice timing unit 14 begins to execute timing operations for the predetermined time (for example, 180 minutes) at the point when the mobile device 1 has received a response indicating that the location registration with the control server for voice communications 3 has been completed.

Next, when the access restriction has been released by the control server for packet communications 2 (S40), and when the control server for voice communications 3 is under access restriction (S41), this kind of access restriction is notified to the mobile device 1 by system information. Here, the mobile device 1 determines whether or not the control server for packet communications 2 has released the access restriction, and whether or not the timing operations of the PS timer have been temporarily stopped (S42). If the control server for packet communications 2 is under access restriction, or if the timing operations of the PS timer are advancing, the mobile device 1 waits until new system information is received.

On the other hand, the location registration control unit 15 controls the location registration unit 16 to register the location with the control server for packet communications 2 if the control server for packet communications 2 has released the access restriction and if the timing operations of the PS timer have temporarily stopped. For this reason, the location information of the mobile device 1 is automatically registered with control server for packet communications 2 (S43 to S44, location registration step).

Moreover, when this location registration is executed and the completion response thereof has been received, the PS timer restarts the timing operations (S43, packet communications timing step). Then, when the predetermined time (for example, 54 minutes) has elapsed on the PS timer (S50), the location information of the mobile device 1 is automatically registered with control server for packet communications 2 (S50 to S51, location registration step). In addition, when this location registration is executed and the completion response thereof has been received, the PS timer restarts the timing operations (S50, packet communications timing step).

Next, if the control server for packet communications 2 is under access restriction (S60) and if the control server for voice communications 3 has released the access restriction (S61), this kind of access restriction is notified to the mobile device 1 by system information. At this time, no location registration can be executed because the timing operations of the PS timer and the CS timer have not been completed. Subsequently, when the CS timer has timed the set time (for example, 180 minutes) (S70), the location registration control unit 15 controls the location registration unit 16 to register the location of the mobile device 1 with the control server for voice communications 3 (S70). For this reason, the location information of the mobile device 1 is automatically registered with the control server for voice communications 3 for use in voice communications (S70 to S71, location registration step).

Next, after the PS timer has timed the predetermined time (for example, 54 minutes) (S80), the timing control unit 12 controls the timing operations to be temporarily stopped (timing control step). Following this control, the timing operations of the PS timer are temporarily stopped (S80). Here, because the timing of the PS timer has expired, the location registration with the control server for packet communications 2 is suspended, and the location cannot be registered with the control server for packet communications 2.

Figure 8:
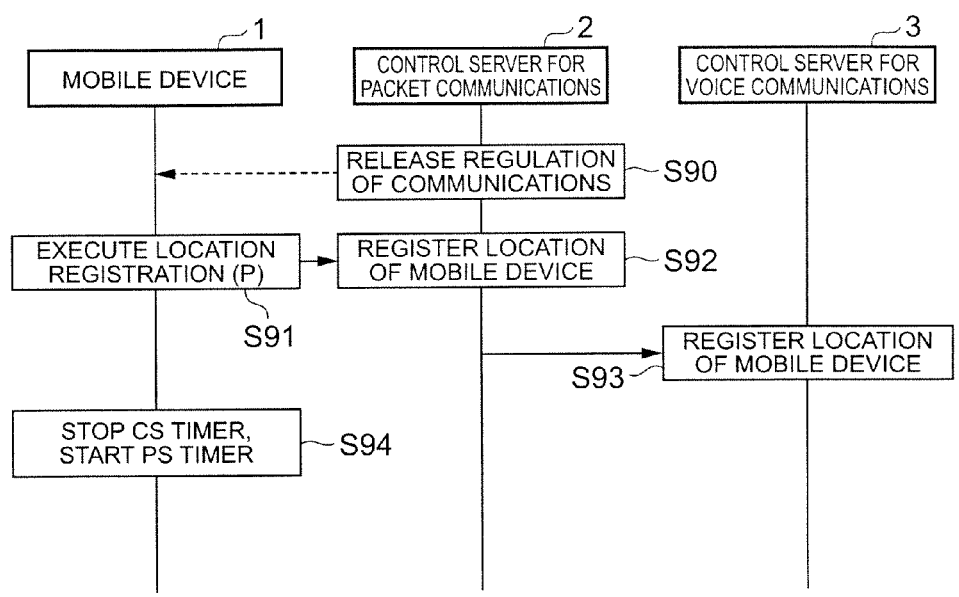
FIG. 8 is a sequence diagram indicating the operations of registering the location of the mobile device during a combined update when the control server for packet communications 2 has released restriction.

Next, the operations after FIG. 7 when the control server for packet communications 2 and the control server for voice communications 3 release the access restriction will be explained. FIG. 8 is a sequence diagram indicating the operations of registering the location of the mobile device 1 at that time.

When the control server for packet communications 2 releases the access restriction (S90), this kind of release of access restriction is notified to the mobile device 1 by system information. Because restriction has been released by both the control server for packet communications 2 and the control server for voice communications 3 and because the timing operations were temporarily stopped at S80, mobile device 1 determines that location registration can be processed (so-called combined update), and the mobile device 1 executes processing to register the location with the control server for packet communications 2 (S91, location registration step).

In conjunction with registering the location of the mobile device 1 (S92), the control server for packet communications 2 executes the so-called combined update by registering the location of the mobile device 1 with the control server for voice communications 3(S93). Wen this location registration processing is executed, the packet timing unit 13 starts timing operations and the voice timing unit 14 stops operations (S94).

Figure 6:
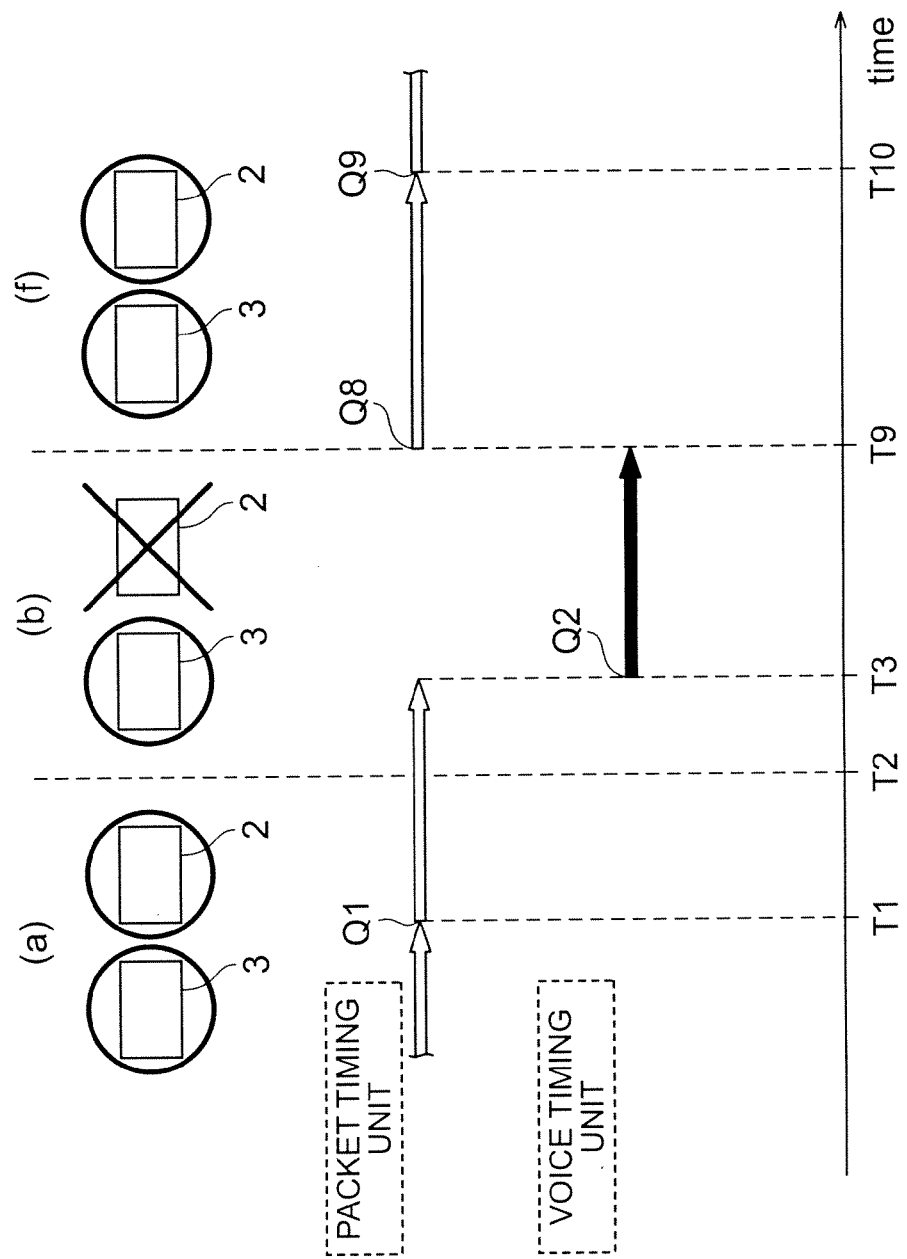
FIG. 6 is a schematic diagram schematically indicating another example of the timing of timing operations and location registration when a combined update is executed.

Continuing, the action and effects of the present embodiment will be explained by referring to FIGS. 4 to 6. First, the location is registered with the control server for packet communications 2 every predetermined time (for example, 54 minutes) (Q1), and if packet communications are restricted (T2), control is executed such that the predetermined time (for example, 54 minutes) is not repeated, and once the predetermined time (for example, 54 minutes) has been timed, the timing operations are temporarily stopped (T3). Then, control can be executed such that, if the restriction of packet communications has been released (T4), and if registration has been executed with the control server for voice communications 3 and the timing operations have been stopped (T4), the location is registered with the control server for packet communications 2 (Q3).

Moreover, as indicated in FIG. 6F, if the restriction of packet communications has been released, and if restriction has been released by the control server for voice communications 3 and the timing operations of the packet timing unit 13 have been stopped (T9), in conjunction with control to register the location with the control server for packet communications 2, control can be executed for the control server for packet communications 2 to register the location with the control server for voice communications 3 (combined update) (Q8). In addition, when the packet timing unit 13 times the predetermined time (T10), in the same way, in conjunction with control to register the location with the control server for packet communications 2, control can be executed for the control server for packet communications 2 to register the location with the control server for voice communications 3 (combined update) (Q9).

It is thereby possible to prevent the control server for packet communications 2 from being unable to ascertain the location of the mobile device 1, and mistakenly determining that the mobile device 1 is not present in the control area of the control server for packet communications 2 for a long period of time (a maximum of 180 minutes in the example above). Consequently, when the access restriction has been released (T4), the control server for packet communications 2 can immediately execute location registration (Q3) and correctly ascertain the presence of the mobile device 1. As a result, call out processing to the applicable mobile device 1 can be reliably executed, and the mobile device 1 can reliably receive incoming calls.

Moreover, when timing operations for registering the location with the control server for packet communications 2 have stopped (T3), the mobile device 1 registers the location with the control server for voice communications 3 (Q2), and after a completion response has been received, in conjunction with executing timing operations for registering location by starting the operations of the voice timing unit 14 (T3), the time stipulated for voice communications set by the system information (for example, 180 minutes) is timed. Then, when the set time (for example, 180 minutes) has been timed (T7), the location can be registered with the control server for voice communications 3 (Q5).

For this reason, it is possible to prevent the control server for voice communications 3 from being unable to ascertain the location of the mobile device 1, and mistakenly determining that the mobile device 1 is not present in the control area of the control server for voice communications 3 for a long period of time (a maximum of 180 minutes in the example above). Consequently, because the control server for voice communications 3 can correctly ascertain the presence of the mobile device 1, call out processing of voice communications to the applicable mobile device 1 can be reliably executed, and the mobile device 1 can reliably receive incoming calls. As a result, the location can be registered either by the control server for packet communications 2 when the predetermined time (for example, 54 minutes) has elapsed, or by the control server for voice communications 3 when the predetermined time (for example, 180 minutes) has elapsed.

Moreover, when packet communications have been restricted (T2), in conjunction with temporarily stopping the timing operations (T3), location registration is also stopped, and therefore, it is possible to control as much as possible unnecessary location registration request messages (specifically, information requesting location registration) from the mobile device 1 during the access restriction (specifically, during convergence). Further, there is no unnecessary exchange of information between the control server for packet communications 2 and the control server for voice communications 3 when packet communications have been restricted (T2), and communications can be restricted.

Moreover, as indicated in FIG. 5E, if both the control server for packet communications 2 and the control server for voice communications 3 have released restriction, when the predetermined time has been timed by the voice timing unit 14 (T7), in conjunction with registering the location with control server for packet communications 2 (Q5), the control server for packet communications 2 is directed to register the location with the control server for voice communications 3 (combined update).

The present invention has been concretely described above based on an embodiment, but the present invention is not limited by the aforementioned embodiment, and may have a variety of variations. Further, the aforementioned embodiment and the follow variations do not limit the scope of the present invention, and a person skilled in the art may develop these embodiments and variations without deviating from the thrust of the claims of the present invention.

For example, the mobile device 1 may comprise a registration communications unit, which combines the function of the receiver 11 and the function of the location registration unit 16, and which substitutes for the receiver 11 and the location registration unit 16.

What is claimed is:

1. A mobile device that receives system information for confirming the location of the mobile device transmitted via a base station per a predetermined interval, and registers its location to a control server for packet communications that memorizes location information of a communications terminal for executing packet communications, and to a control server for voice communications that memorizes location information of a communications terminal for executing voice communications, comprising:

a timing unit for packet communications that times a predetermined time;

a location registration unit that registers a location of the mobile device to said control server for packet communications;

a timing control unit that, when the mobile device determines that said control server for packet communications has restricted communications with an access restriction by receiving the system information including restriction information, controls timing operations of the timing unit for packet communications to temporarily stop when said timing unit for packet communications has reached the predetermined time;

a location registration control unit that controls said location registration unit to register the location to said control server for packet communications for each interval of the predetermined time timed in said timing unit for packet communications when there is no previous access restriction from the control server for packet communications, and also controls said location registration unit to register the location to said control server for packet communications when said control server for packet communications has released a previous access restriction and the timing operations of said timing unit for packet communications are stopped by said timing control unit; and a voice communications timing unit that times a second predetermined time, wherein when the mobile device determined that communication is being restricted by the control server for packet communications by receiving the system information including restriction information, and the timing unit for packet communications has reached the predetermined time, the location registration unit registers the location of the mobile device with the control server for voice communications and the voice communications timing unit begins a timer for the second predetermined time when the location registration with the control server for voice communications has been completed, and when the voice communications timing unit reaches the second predetermined time, the location registration unit registers the location of the mobile device with the control server for voice communications when there is no access restriction from the control server for voice communications.

2. A location registration method implemented on a mobile device that receives system information for confirming the location of the mobile device transmitted via a base station per a predetermined interval, and that registers a location of the mobile device to a control server for packet communications that memorizes location information of a communications terminal for executing packet communications and to a control server for voice communications that memorizes location information of a communications terminal for executing voice communications, the method comprising:

timing, at a timing unit for packet communications of the mobile device, for a predetermined time;

registering, at a location registration unit of the mobile device, a location of the mobile device to said control server for packet communications;

when the mobile device determines that said control server for packet communications has restricted communications with an access restriction by receiving the system information including restriction information, controlling timing operations, at a timing control unit of the mobile device, to temporarily stop when the predetermined time is reached in the timing unit for packet communications; and controlling, at a location registration unit of the mobile device, the location to be registered to said control server for packet communications in said location registration unit for each interval of the predetermined time timed in said timing unit for packet communications when there is no previous access restriction from the control server for packet communications, and also controlling the location to be registered to said control server for packet communications when a previous access restriction is released by said control server for packet communications, and the timing operations of said timing unit for packet communications are stopped by said timing control unit;

timing, at a voice communications timing unit, a second predetermined time;

when the mobile device determined that communication is being restricted by the control server for packet communications by receiving the system information including restriction information, and the timing unit for packet communications has reached the predetermined time, registering, at the location registration unit, the location of the mobile device with the control server for voice communications and beginning a timer at the voice communications timing unit for the second predetermined time when the location registration with the control server for voice communications has been completed; and when the voice communications timing unit reaches the second predetermined time, registering, at the location registration unit, the location of the mobile device with the control server for voice communications when there is no access restriction from the control server for voice communications.

3. The mobile device according to claim 1, wherein when communication is not being restricted by both the control server for packet communications and the control server for voice communications, the location registration unit registers the location of the mobile device to the control server for voice communications through the control server for packet communications.

4. The mobile device according to claim 1, wherein when the voice communications timing unit reaches the second predetermined time, and when there is no access restriction from both the control server for packet communications and the control server for voice communications, the location registration unit registers the location of the mobile device with the control server for packet communications and the control server for voice communications.

5. The mobile device according to claim 1, wherein when said voice server for packet communications has released a previous access restriction for voice communications, the timing operations of said timing unit for packet communications has not reached the predetermined time, and the voice communications timing unit has not reached the second predetermined time, the location registration unit does not register the location of the mobile device with the control server for packet communications or the control server for voice communications.

* * * * *